United States Patent [19]
Ross

[11] 3,779,151
[45] Dec. 18, 1973

[54] FORCE-LIMITED INJECTION SYSTEM FOR MEAT PROCESSING
[75] Inventor: Henry M. Ross, Nokesville, Va.
[73] Assignee: Ross Industries, Inc., Midland, Va.
[22] Filed: Mar. 13, 1972
[21] Appl. No.: 233,893

[52] U.S. Cl. .................................................. 99/533
[51] Int. Cl............................................. A23b 1/16
[58] Field of Search............................. 99/533, 532; 27/24 R; 128/215, 216

[56] References Cited
UNITED STATES PATENTS
| | | | |
|---|---|---|---|
| 3,381,603 | 5/1968 | Jensen et al. | 99/533 |
| 2,587,024 | 2/1952 | Avery | 99/533 |
| 2,645,171 | 7/1953 | Moreland | 99/533 |
| 3,344,731 | 10/1967 | Trees | 99/533 |

*Primary Examiner*—Harvey C. Hornsby
*Assistant Examiner*—Arthur O. Henderson
*Attorney*—T. J. Crickenberger

[57] ABSTRACT

A fluid-operated apparatus for injecting seasoning solutions into meat having a reciprocable head with spaced, independently force-limited needle elements disposed over a conveyor belt for injecting the meat as it is successively positioned by longitudinal and lateral movement of the conveyor belt. The needle elements have individual poppet valves actuated by needle penetration into the meat. The needles are pushed back into the head when bone or cartilage is encountered and a predetermined force is exceeded, thereby protecting them from damage.

3 Claims, 2 Drawing Figures

FORCE-LIMITED INJECTION SYSTEM FOR MEAT PROCESSING

BACKGROUND OF THE INVENTION

A substantial portion of processed meats such as hams, bacon, corned beef, etc. are cured by the injection of chemical compounds and spices. Many varieties of apparatus have been developed to perform the injection operation and these have been successful in varying degrees.

In more recent years the advantages of injecting more subtle seasoning solutions in fresh meat to improve flavor and succulency have become apparent. Unfortunately, prior art injection devices have had little success in achieving the desired results. A brief analysis of the problem quickly makes apparent the shortcomings of previous devices and highlights the advantages of the present invention.

Ideally, needles used for injecting should have a cross-section sufficiently small to eliminate tearing and to make the point of entry invisible after withdrawal. Test and field experience have shown that the limiting diameter for a circular cross-section is approximately one-sixteenth inch. If such needles are sufficiently long to penetrate primal cuts of meat (approximately 5 inches to 6 inches thick), they will be extremely fragile and means must be provided to protect them from damage by cartilage, bone or ice. Priot art devices have attempted to minimize the breakage problem by utilizing large diameter needles and spring-rate force-limiting. Unfortunately, large diameter needles cause substantial tearing of the meat, and the physical space requirements for the spring-rate limiting systems (which are effective only on large diameter needles) makes it virtually impossible to achieve sufficiently close spacing for uniform infusion.

To achieve reasonable processing speed, a practical injector system should have a plurality of needles. It is highly desirable that fluid be dispensed only from those needles which are actually in the meat in order to minimize waste and overspray. While some prior art devices have provided means for "turning on" individual needles upon contact with meat, their valving system is impractical for small cross-section needles. This is because they require large operating forces which can be supplied only by large diameter needles encountering penetration resistance higher than the operating force requirements.

The problem then reduces to that of providing a true force-limiting system for very slender needles and providing an operating stroke sufficiently long to process primal cuts. These features must be combined with a valving system capable of a reliable operation by the small penetration forces. Only a true force-limiting system as described in U. S. Pat. No. 3,535,734 can achieve the desired close limits. The force-limiting aspects of this invention operate in essentially the same manner as system described in U. S. Pat. No. 3,535,734, and the structure described and claimed herein can be utilized as an attachment device to the system of the patent.

SUMMARY OF THE INVENTION

In accordance with the present invention a force-limiting system is combined with a needle-operated poppet valve. The upper end of a hollow needle is mounted for limited vertical movement within a valve sleeve member. The end is sealed by a cap which fits within the sleeve loosely so as to allow the passage of fluid therearound. The needle is surrounded by a valve seat which mates with a seal carried by the underside of the cap. A hole in the needle wall is exposed above the valve seat when the needle is urged upwardly in making contact with the meat to be injected.

The slender needle structure is given moment-resisting support by upper and lower needle guide members. The lower guide member also serves as a stripper-plate to hold down the meat while the needles are being withdrawn.

DESCRIPTION OF THE PREFERRED EMBODIMENT

Figure 1:
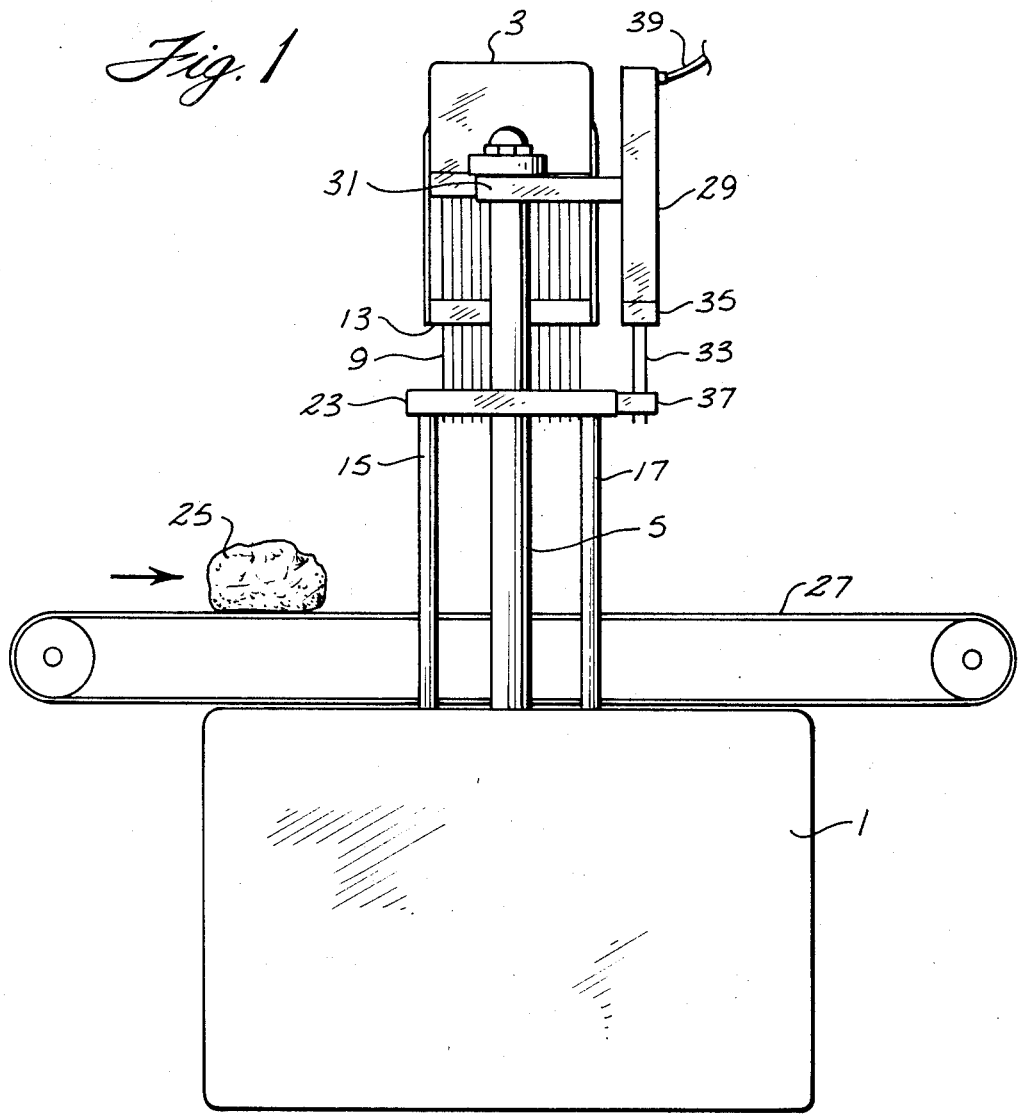
FIG. 1 is a side elevation of a machine incorporating the device of the invention as an attachment.

The invention will be understood more readily by referring to the following description of the preferred embodiment of the invention shown in the drawings. FIG. 1 is a side view diagrammatically representing the machine described in and claimed in U.S. Pat. No. 3,535,734 with the device of the present invention shown as an attachment thereto. The cabinet 1 contains details of working parts which are immaterial to the understanding of this invention. Cabinet 1 has mounted thereon a reciprocable pressure-head 3 which is supported by a pair of head rod supports. Support 5 can be seen from this figure.

A plurality of cutting elements shown generally at 9 depend from the lower surface of reciprocable pressure-head 3 and project through an upper guide member 13. Beneath the cutting elements 9 and depending from pressure-head 3 is a lower guide hold-down member 23 which is mounted on and held in position by hold-down rod supports 15 and 17 shown in FIG. 1. Both upper guide 13 and lower guide hold-down member 23 are provided with spaced apertures which coincide with the positioning of cutting elements 9 to provide free passage there-through.

A piece of meat 25 to be processed is placed on conveyor belt 27 and moved into position under reciprocable head 3. The lower guide and hold-down member 23 is forced downwardly until it contacts the meat. The meat to be processed is thereby held in position while it is pierced by the cutting elements as pressure-head 3 is forced downwardly. The hold-down member 23 is held in its lowermost position while the pressure-head 3 and cutting elements 9 are raised. This action prevents the meat from being displaced when the cutting elements are withdrawn.

Each of the cutting elements 9 is independently operated by fluid pressure to produce a true force-limited system of operation as set forth more completely in U.S. Pat. No. 3,535,734. As described in that patent, the conveyor belt 27 is capable of longitudinal and lateral motion in intermittent fashion to produce an interspersed piercing pattern of the cutting elements 9.

In accordance with the present invention, a reciprocable injection-head structure 29 is fixedly mounted to head 3 by means such as mounting arm 31. Head 29 moves up and down with head 3. Depending from head 29 are needle elements shown generally at 33. These needle elements 33 project through upper needle guide 35 and lower needle guide 37. Upper and lower needle guides 35 and 37 perform functions similar to upper cutting element guide 13 and lower guide hold-down member 23 associated with head 3. A manifold within head 29 may be connected to a source of seasoning solution by means of hose 39.

Figure 2:
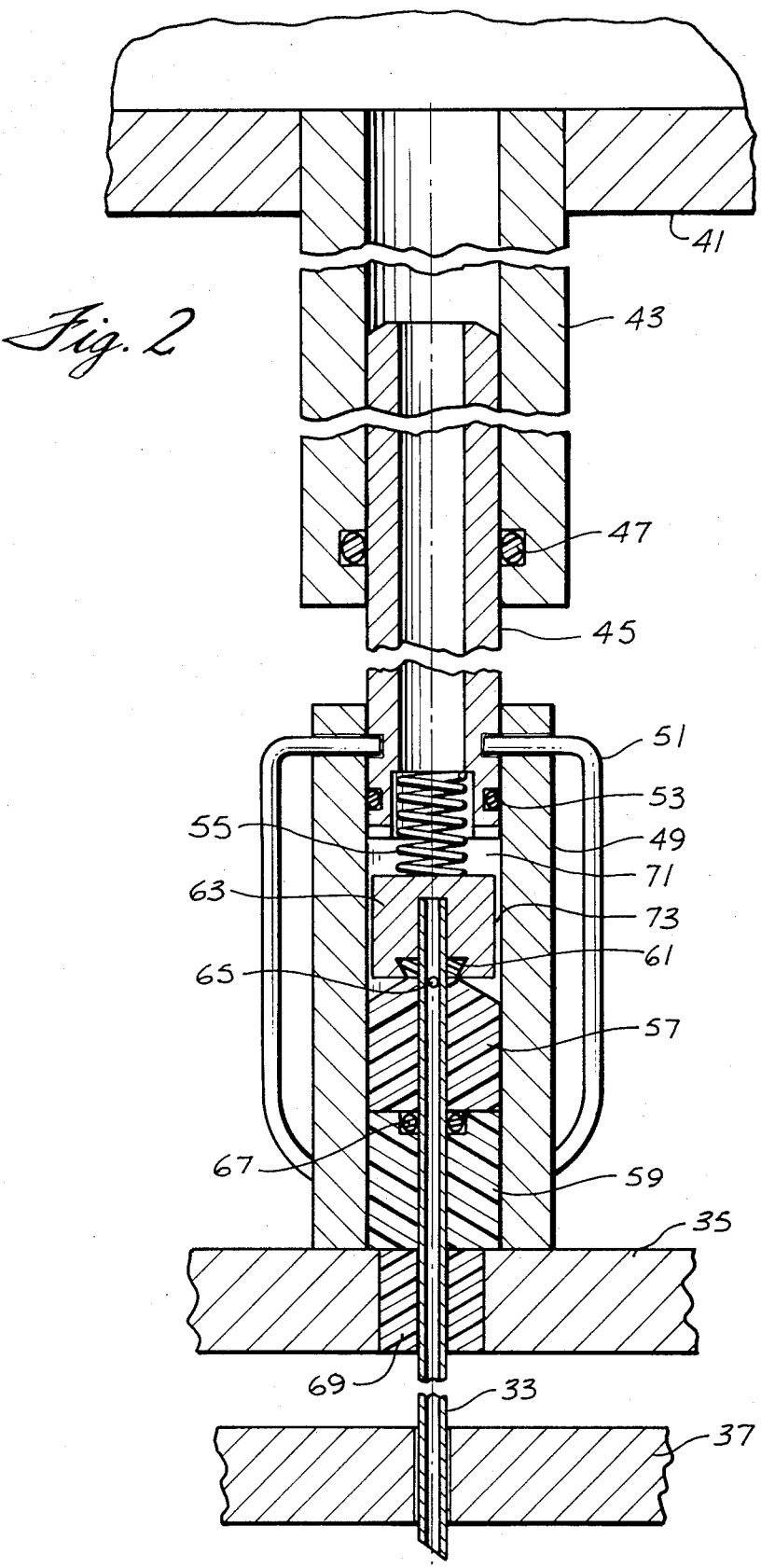
FIG. 2 is a cross-sectional view of an injection needle structure utilizing the principles of the invention.

The specific structure of the needles 33 within head 29 will be seen more readily from FIG. 2 of the drawings. Manifold 41 is designed to contain the seasoning solution, and depending therefrom is a section of tubing 43 which is fixedly mounted to manifold 41. Tube 43 slidably receives tube 45 which depends from the lower end of tube 43. A typical O-ring seal 47 provides a fluid-tight joint between the slidable sections 43 and 45. The lower end of section 45 has a valve sleeve member 49 attached thereto in fixed position by means of retainer clip 51. O-ring 53 provides a fluid-tight connection between tube section 45 and valve sleeve 49.

Needle 33 is hollow and has a hole 65 near its upper end. A cap structure 63 covers the upper end of needle 33. The underside of cap 63 has a resilient valve seal 61 recessed therein. Valve seal 61 rests on valve seat 57 to prevent the passage of fluid through hole 65 in needle 33. Needle guide 59 has an O-ring seal 67 recessed therein to prevent fluid loss along the outer surface of needle 33.

Cap 63 is loosely mounted in valve sleeve 49 to permit the passage of fluid along the side thereof as shown at 73. A spring 55 is provided to urge cap 63 downwardly and close the valve. This spring is not essential to the operation of the valve since the fluid pressure and needle weight will suffice to prevent fluid leakage through the valve.

In accordance with the present invention a force-limiting system is combined with a needle-operated valve. The significant characteristics of this valve are:
1. The seal area is approximately equal to the cross-sectional area of the needle. This is essential in order to minimize the fluid pressure force which must be overcome to open the valve.
2. The poppet configuration insures full flow with minimal movement.

In order to achieve maximum needle column strength, moment-resisting upper and lower needle guides are provided. The lower needle guide provides guidance and moment resisting support as close as possible to the point of meat entry, and additionally, acts as a stripper plate to hold the meat in contact with the conveyor surface during withdrawal of the needles.

In operation, the plurality of needle assemblies and their fluid supply manifold are raised and lowered vertically to effect insertion and removal, and the meat is transported a predetermined distance forward and laterally between strokes to properly interdigitate the injections.

Since the individual needles are actuated upon meat contact and injection continues for the length of the penetration stroke, metering is self regulatory. The period of flow will be proportional to the local meat thickness.

What is claimed is:
1. An injection system for injecting seasoning solutions into meat comprising
    manifold means for coupling to a source of seasoning solution,
    a plurality of hollow needles depending from said manifold means for injecting seasoning solutions into the meat,
    means including a plurality of telescoping tubes coupling said needles to said manifold means for independent, force-limited insertion into the meat,
    said coupling means further including a valve sleeve surrounding the upper end of each of said hollow needles,
    valve seat means mounted within said valve sleeve,
    cap means sealing the upper end of each needle,
    said cap means being mounted for limited movement within said valve sleeve and being dimensioned to allow the passage of solution therearound, and
    valve seal means mounted in said cap means for forming a seal with said valve seat means to prevent the passage of solution through said hollow needles until said needles are moved upwardly.
2. The combination according to claim 1 comprising upper needle guide means to provide moment-resisting support for the needles.
3. The combination according to claim 1 comprising lower needle guide means which engaged the meat to be injected to provide moment-resisting support for the needles and hold the meat in position when the needles are withdrawn.

* * * * *